C. BAUM.
SNAP FASTENER.
APPLICATION FILED MAY 8, 1919.

1,386,306.

Patented Aug. 2, 1921.

Inventor:
Charles Baum
by attorneys

UNITED STATES PATENT OFFICE.

CHARLES BAUM, OF BROOKLYN, NEW YORK.

SNAP-FASTENER.

1,386,306.

Specification of Letters Patent.

Patented Aug. 2, 1921.

Application filed May 8, 1919. Serial No. 295,665.

*To all whom it may concern:*

Be it known that I, CHARLES BAUM, a citizen of the United States, and resident of the borough of Brooklyn, in the city and State of New York, have invented a new and useful Improvement in Snap-Fasteners, of which the following is a specification.

The object of my invention is to provide the members of a snap fastener with thread receiving grooves connecting the stitching holes, whereby the thread which is used to stitch the members of the fastener to the garment may be embedded below the adjacent faces of the members, where the thread will be protected from being cut or worn through; the countersinking of the thread permitting the snap fastener members to be brought closely together and allowing the spring in the female member to firmly snap under the head of the male member, thereby diminishing the chances for the accidental separation of the members.

A practical embodiment of my invention is represented in the accompanying drawings in which, Figure 1 represents the snap fastener in side elevation.

Figure 1:
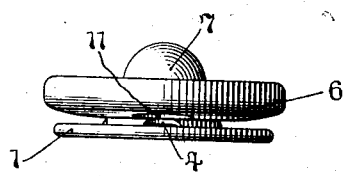
Figure 2:
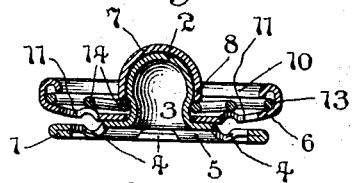
Fig. 2 represents a central section through the fastener in the plane of the stitching holes.
Figure 3:
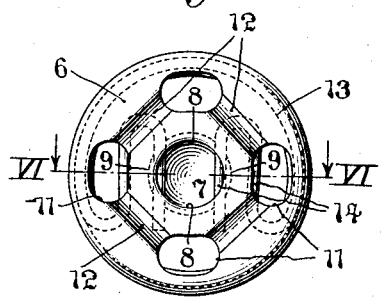
Fig. 3 represents a face view of the female member.
Figure 5:
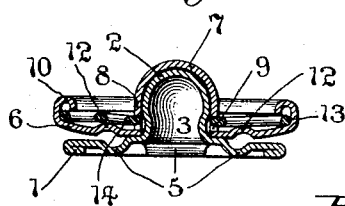
Fig. 5 represents a central section through the fastener in a plane between the stitching holes.
Figure 6:
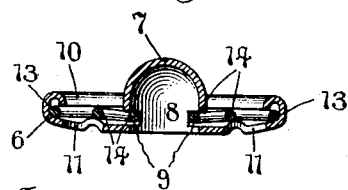
Fig. 6 represents a central section taken in the plane of the line VI—VI of Fig. 3.
Figure 4:
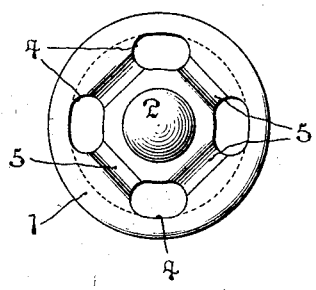
Fig. 4 represents a face view of the male member.

The male member comprises a base 1, provided with a centrally arranged hollow head 2 and a reduced neck 3. The base is provided with the usual annular series of stitching holes 4, which holes are connected by thread receiving grooves 5, formed by distorting the metal of the base 1 of the fastener.

The female member comprises the cupped base 6 provided with a centrally arranged hollow socket 7 having parallel side walls 8 in which are located diametrically opposed transverse slots 9. The base 6 has a turned-over edge 10 forming a retaining flange for the male member engaging spring.

The base 6 of the female member is provided with the usual annular series of stitching holes 11 connected by the thread receiving grooves 12 which grooves are formed by distorting the metal of the base.

The curved body portion 13 of the spring is seated within the turned-over edge 10 of the female member and the branches 14 of the spring are preferably bent back and forth as shown to form double loops, the free ends of which are located within the transverse slots 9 in the socket 7 in position to engage and retain the head 2 of the male member of the snap fastener when the head is inserted into the socket 7 of the female member.

The parts are so shaped that the members will be drawn snugly together by the pressure of the spring when the members are united.

By providing the bases of the two members with the thread receiving grooves, the thread which is used to secure the members to the garment will be embedded or countersunk in said grooves, thus reducing the liability of the thread to become cut or worn through and also permitting the members to be brought closely together and allow the spring to secure a firm grip under the head of the male member, thus decreasing the chances for accidental opening of the fastener.

It is evident that various changes may be resorted to in the form, construction and arrangement of the several parts without departing from the spirit and scope of my invention, hence I do not wish to limit myself to the construction herein shown, but—

What I claim is:—

1. In a snap fastener, the male member having an annular series of stitching holes through its base and thread receiving grooves in the exposed face of the said member, connecting said holes.

2. In a snap fastener, the female member having an annular series of stitching holes through its base and thread receiving grooves in the exposed face of the said member, connecting said holes.

In testimony that I claim the foregoing as my invention, I have signed my name this 24th day of April, 1919.

CHARLES BAUM.